US012748588B2

(12) United States Patent
Griffin et al.

(10) Patent No.: US 12,748,588 B2
(45) Date of Patent: Sep. 29, 2026

(54) PACKAGE MAINTENANCE ARCHITECTURE

(71) Applicant: Red Hat, Inc., Raleigh, NC (US)

(72) Inventors: Leigh Griffin, Waterford (IE); Leonardo Rossetti, Sao Paulo (BR)

(73) Assignee: Red Hat, LLC, Raleigh, NC (US)

( * ) Notice: Subject to any disclaimer, the term of this patent is extended or adjusted under 35 U.S.C. 154(b) by 499 days.

(21) Appl. No.: 17/875,037

(22) Filed: Jul. 27, 2022

(65) Prior Publication Data

US 2024/0036884 A1 Feb. 1, 2024

(51) Int. Cl.
*G06F 8/71* (2018.01)
*G06F 8/65* (2018.01)

(52) U.S. Cl.
CPC . *G06F 8/71* (2013.01); *G06F 8/65* (2013.01)

(58) Field of Classification Search
CPC .................................... G06F 8/71; G06F 8/65
See application file for complete search history.

(56) References Cited

U.S. PATENT DOCUMENTS 8,255,362 B2 * 8/2012 Johnson .................... G06F 8/65 707/636
8,561,062 B2 * 10/2013 Hicks .................. G06F 9/44505 718/1
8,949,788 B2 * 2/2015 Bonnet ..................... G06F 8/35 717/122
9,772,834 B2 * 9/2017 Vidal ........................ G06F 8/65
10,282,175 B2 * 5/2019 Busjaeger ............. G06F 16/273
10,846,081 B2 * 11/2020 Sigmon ............... G06F 16/1873
11,099,834 B2 8/2021 Cikoski
2015/0242197 A1 * 8/2015 Alfonso .................... G06F 8/65 717/173
2019/0146772 A1 * 5/2019 Griffin ...................... G06F 8/71 717/121
2020/0272454 A1 * 8/2020 Cikoski ................... G06F 8/658
2021/0084109 A1 * 3/2021 Gimenez Palop .... H04W 12/02
(Continued)

OTHER PUBLICATIONS

St. Pierre, C., et al., "Staging Package Deployment via Repository Management," LISA'11: Proceedings of the 25th International Conference on Large Installation System Administration, www.usenix.org/legacy/event/lisa11/tech/full_papers/Pierre.pdf, Dec. 2011, 8 pages.

*Primary Examiner* — Lewis A Bullock, Jr.
*Assistant Examiner* — Theodore E Hebert
(74) *Attorney, Agent, or Firm* — Dority & Manning, P.A.

(57) ABSTRACT

A package maintenance architecture can be provided for a computing system. For instance, a change status can be determined, the change status corresponding to a difference between reference content and endpoint content of at least one package storage location of a plurality of package storage locations. An update for the at least one package storage location can be determined based on the change status, wherein the update is configured according to a respective configuration scheme of a plurality of configuration schemes respectively associated with the plurality of package storage locations, and wherein the respective configuration scheme is associated with the at least one package storage location. Updating of the at least one package storage location according to the update can be initiated.

17 Claims, 5 Drawing Sheets

(56) References Cited

U.S. PATENT DOCUMENTS

| | | | | |
|---|---|---|---|---|
| 2021/0157896 | A1* | 5/2021 | Hashmi | G06F 21/41 |
| 2022/0060398 | A1* | 2/2022 | Shishir | H04L 43/08 |
| 2022/0116445 | A1* | 4/2022 | Filippou | H04L 41/0853 |
| 2022/0300611 | A1* | 9/2022 | Sivaswamy | G06F 21/57 |
| 2024/0036884 | A1* | 2/2024 | Griffin | G06F 8/65 |

* cited by examiner

PACKAGE MAINTENANCE ARCHITECTURE

BACKGROUND

Container orchestration systems automate the deployment, scaling, and management of containerized applications among nodes in a cluster. Some applications can build packages (e.g., data packages, software packages, etc.) from packaged components.

SUMMARY

The examples disclosed herein provide for implementing a package maintenance architecture. For example, various package storage locations can host packages for distribution, and the various locations can be configured according to different configuration schemes. A package maintenance architecture according to the present disclosure can automatically coordinate compliance with the different coordination schemes for the various package storage locations to facilitate efficient distribution of packages from the various locations.

In one example a method is provided. The example method includes determining, by a computing system including one or more processor devices, a change status corresponding to a difference between reference content and endpoint content of at least one package storage location of a plurality of package storage locations. The example method includes determining, by the computing system and based on the change status, an update for the at least one package storage location, wherein the update is configured according to a respective configuration scheme of a plurality of configuration schemes respectively associated with the plurality of package storage locations, and wherein the respective configuration scheme is associated with the at least one package storage location. The example method includes initiating, by the computing system, updating of the at least one package storage location according to the update.

In another example, a computing device is provided. The example computing device includes a memory and a processor device coupled to the memory to determine a change status corresponding to a difference between reference content and endpoint content of at least one package storage location of a plurality of package storage locations. The example computing device includes the memory and the processor device coupled to the memory to determine, based on the change status, an update for the at least one package storage location, wherein the update is configured according to a respective configuration scheme of a plurality of configuration schemes respectively associated with the plurality of package storage locations, and wherein the respective configuration scheme is associated with the at least one package storage location. The example computing device includes the memory and the processor device coupled to the memory to initiate updating of the at least one package storage location according to the update.

In another example a non-transitory computer-readable storage medium is provided. The example non-transitory computer-readable storage medium includes executable instructions to cause one or more processor devices of one or more computing devices to determine a change status corresponding to a difference between reference content and endpoint content of at least one package storage location of a plurality of package storage locations. The example non-transitory computer-readable storage medium includes executable instructions to cause one or more processor devices of one or more computing devices to determine, based on the change status, an update for the at least one package storage location, wherein the update is configured according to a respective configuration scheme of a plurality of configuration schemes respectively associated with the plurality of package storage locations, and wherein the respective configuration scheme is associated with the at least one package storage location. The example non-transitory computer-readable storage medium includes executable instructions to cause one or more processor devices of one or more computing devices to initiate updating of the at least one package storage location according to the update.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
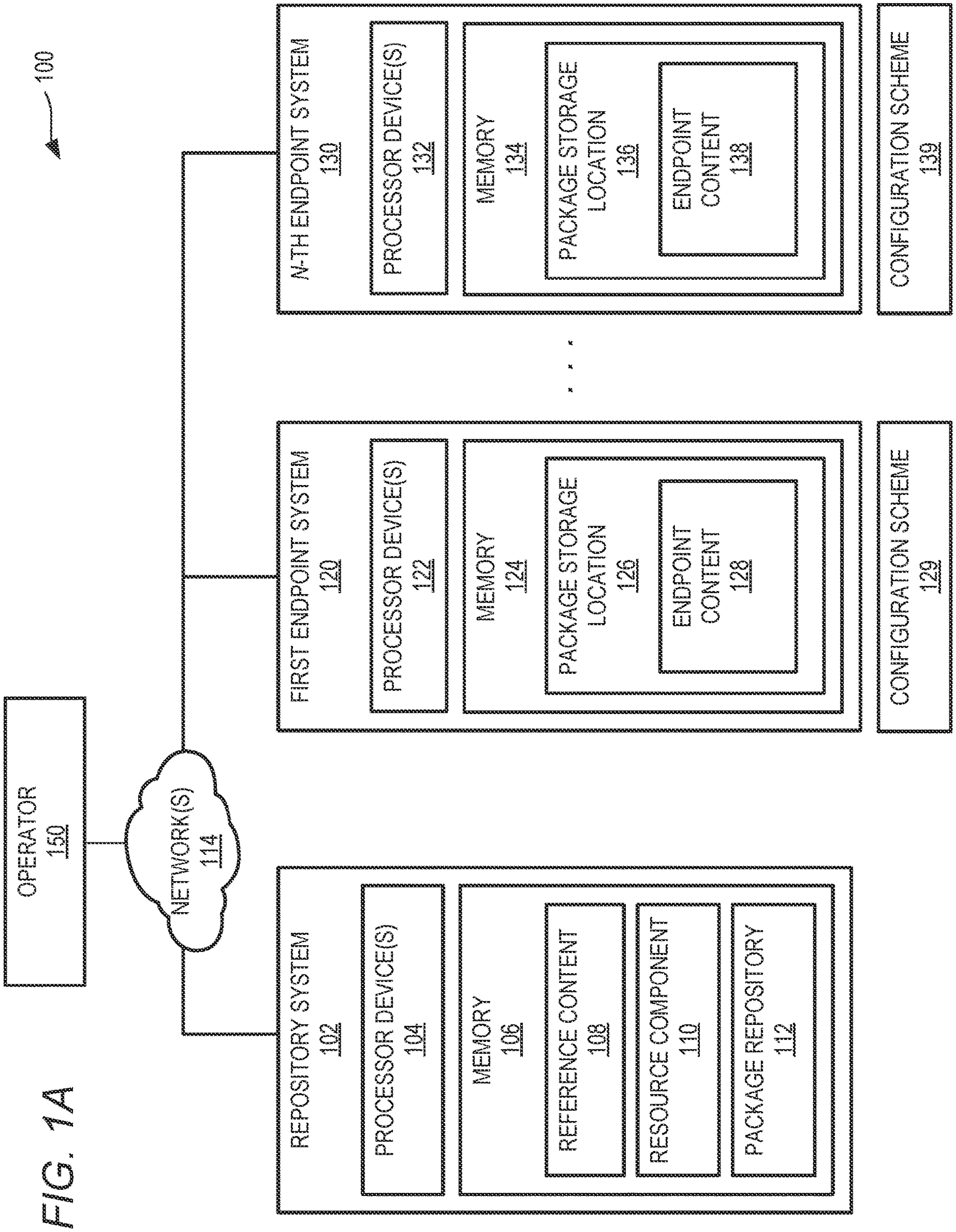
FIG. 1A is a block diagram of a runtime environment in which examples of a package maintenance architecture according to example aspects of the present disclosure can be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

In some examples, software or other packaged data objects can be distributed over a network by a package delivery system. A package delivery system can leverage multiple different distribution endpoints providing multiple different package storage locations for delivering packages to different recipients or in different formats. Package storage locations can be implemented on local computing systems, on distributed computing systems, on virtual computing systems, or any other type of computing system. In some examples, such diversity can provide for improved distribution from the package repository (e.g., to reduce latency of distribution in different formats, in different environments, etc.). But in traditional approaches, a user must generally manually configure and upload a package to each different endpoint based on the different requirements of the different endpoints (e.g., different APIs, different filesystems, different credentials, etc.). As packages are created or updated over multiple iterations, the manual workload can increase exponentially.

In contrast, example implementations disclosed herein can provide for automatic upload of packages to a package storage location according to a configuration scheme associated with the package storage location, thereby providing for increased efficiency of package distribution networks. For example, example implementations can determine a change status for a package delivery system comprising a package repository and a plurality of package storage locations. The change status can correspond to a difference between reference content and endpoint content of at least one package storage location of the plurality of package storage locations. Example implementations can determine, based on the change status, an update for the at least one package storage location. The update can be configured according to a respective configuration scheme of a plurality of configuration schemes respectively associated with the plurality of package storage locations (e.g., the respective configuration scheme being associated with the at least one package storage location). Example implementations can initiate updating of the at least one package storage location according to the update.

Example implementations are discussed herein in more detail with reference to the Figures by way of example only for the purposes of illustration.

FIG. 1A is a block diagram of an environment suitable for example implementations of the present disclosure. FIG. 1A depicts an example package delivery system 100. A repository system 102 can be a computing system that includes processor device 104 and memory 106. In some implementations, the repository system 102 can be a computing system that includes multiple computing devices. Alternatively, in some implementations, the repository system 102 can be or include one or more computing devices within a computing system that includes multiple computing devices. Additionally, or alternatively, the repository system 102 can be implemented using shared resources of a computing device (e.g., processor device 104 and memory 106 being shared with one or more other systems, applications, processes, etc.).

In some implementations, the repository system 102 can be an instantiation of a system or process under control, management, or access by a party associated with the system or process. For instance, the repository system 102 can be a "first-party" system associated with a first-party entity. The repository system 102 can be implemented on premises or in be remotely implemented or managed by a third-party compute hosting service (e.g., on one or more cloud servers).

In some implementations, the repository system 102 can be implemented by a deployed application in a containerized environment. The processor device 104 can include any computing or electronic device capable of executing software instructions to implement the functionality described herein. The memory 106 can be or otherwise include any device(s) capable of storing data, including, but not limited to, volatile memory (random access memory, etc.), non-volatile memory, storage device(s) (e.g., hard drive(s), solid state drive(s), etc.).

The memory 106 can include reference content 108 that sets out or defines the contents of a desired repository. For instance, reference content 108 can include packages produced by the first-party entity for distribution to various recipients. In some implementations, the reference content 108 can include an enumeration or listing of packages (e.g., additionally or alternatively to the packages themselves). In some implementations, the repository system 102 can update reference content 108 periodically to reflect the status of packages associated with the repository system 102. For instance, the repository system 102 can update reference content 108 based on deployment or publication a new package (e.g., including a new version of a preexisting package). In some implementations, the repository system 102 can update reference content 108 by uploading the new package to memory 106. In some implementations, the repository system 102 can update reference content 108 to cause one or more downstream systems to obtain the new package from another storage device or system.

In some implementations, the reference content 108 can contain packages or other data objects specified by a resource component 110. For instance, a resource component 110 can define the contents of a desired repository. For example, a resource component 110 can tag, enumerate, list, or otherwise associate a group of one or more packages. The resource component 110 can include instructions or a policy associated with the reference content 108. The resource component 110 can be associated with any level of an organization hierarchy. For instance, the resource component 110 can be associated with a single package. The resource component 110 can be associated with a group of packages (e.g., a tag facilitating association of a group of packages). The resource component 110 can be associated with one or more subgroups of a superset of packages.

In some implementations, the resource component 110 defines the reference content 108 (e.g., such that reference content 108 is contained in or expressed by the resource component 110). In some implementations, the reference content 108 is defined collectively by multiple resource components 110.

Additionally, or alternatively, a package repository 112 of the repository system 102 can define or express the reference content 108. For example, the package repository 112 can form a central reference repository for the package delivery system 100. In this manner, for example the package repository 112 can form a set of desired packages (e.g., up-to-date versions, long-term support versions, etc.) for distribution by the package delivery system 100.

In some implementations, the resource component 110 can include a list of endpoints through which one or more of the packages of the reference content 108 (e.g., packages in the package repository 112, etc.) are to be distributed. In some implementations, the resource component 110 can include instructions for interfacing with the various endpoints. For example, the resource component 110 can include security credentials, tokens, passkeys, API components, scripts, etc. for interfacing with the various endpoints for distribution of the reference content 108. Generally, the set of instructions and configuration details for interfacing with the various endpoints are referred to herein as a configuration scheme. Each of a variety of different endpoints can have different configuration schemes.

The package delivery system 100 can include a network 114. The package delivery system 100 can include (e.g., connected to the network 114) a first endpoint system 120 having a processor device 122 and a memory 124 providing a package storage location 126 for storing endpoint content 128.

In some implementations, the first endpoint system 120 can provide a distribution access point on the edge of the package delivery system 100. For example, the first endpoint system 120 can be associated with servicing a particular geographic region in which the first endpoint system 120 is located. For example, the first endpoint system 120 can be associated with a particular filesystem format or software ecosystem catered toward servicing a group of recipients. For example, the first endpoint system 120 can be a physical computing system or can be virtualized. The first endpoint system 120 can be associated with the first-party entity (e.g., an entity associated with the repository system 102), either directly or via compute services rendered on behalf of the first-party entity. For instance, in some implementations, the first endpoint system 120 can be a cloud computing system operated by a third-party cloud computing service provider on behalf of the first-party entity. For instance, in some implementations, the first endpoint system 120 can form part of a content distribution network (CDN).

In some implementations, the first endpoint system 120 can be associated with the repository system 102. For example, the first endpoint system 120 can include a local filesystem shared with the repository system 102. For instance, in some implementations, the first endpoint system 120 is co-located with the repository system 102, or otherwise forms a part of the repository system 102.

In some implementations, the first endpoint system 120 can be a computing system that includes multiple computing devices. Alternatively, in some implementations, the first endpoint system 120 can be or include one or more computing devices within a computing system that includes multiple computing devices. Additionally, or alternatively, the first endpoint system 120 can be implemented using shared resources of a computing device (e.g., processor device 122 and memory 124 being shared with one or more other systems, applications, processes, etc.). For example, in some implementations, processor device(s) 122 can be implemented by processor device(s) 104, and memory 124 can be shared with memory 106.

In some implementations, the first endpoint system 120 can be configured according to a configuration scheme 129. For instance, the configuration scheme 129 can include various requirements for interfacing with the first endpoint system 120. For instance, requirements can include access credentials, data formats, filesystem formats, package delivery formats, etc.

The package delivery system 100 can include (e.g., connected to the network 114) multiple endpoint systems. For instance, the package delivery system 100 can include (e.g., connected to the network 114) n-th endpoint system 130 having a processor device(s) 132 and a memory 134 providing a package storage location 136 for storing endpoint content 138.

In some implementations, the n-th endpoint system 130 can provide a distribution access point on the edge of the package delivery system 100. In some examples, the n-th endpoint system 130 can be associated with servicing a particular geographic region in which the n-th endpoint system 130 is located (which can be the same or different as a region associated with first endpoint system 120). In some examples, the n-th endpoint system 130 can be associated with a particular filesystem format or software ecosystem catered toward servicing a group of recipients. In some examples, the n-th endpoint system 130 can be a physical computing system or can be virtualized. The n-th endpoint system 130 can be associated with the first-party entity (e.g., an entity associated with the repository system 102), either directly or via compute services rendered on behalf of the first-party entity. For instance, in some implementations, the n-th endpoint system 130 can be a cloud computing system operated by a third-party cloud computing service provider on behalf of the first-party entity. For instance, in some implementations, the n-th endpoint system 130 can form part of a content distribution network (CDN).

In some implementations, the n-th endpoint system 130 can be associated with the repository system 102. For example, the n-th endpoint system 130 can include a local filesystem shared with the repository system 102. For instance, in some implementations, the n-th endpoint system 130 is co-located with the repository system 102, or otherwise forms a part of the repository system 102.

In some implementations, the n-th endpoint system 130 can be associated with the first endpoint system 120. For example, the n-th endpoint system 130 can include a local filesystem shared with the first endpoint system 120. For instance, in some implementations, the n-th endpoint system 130 is co-located with the first endpoint system 120, or otherwise forms a part of the first endpoint system 120.

In some implementations, the n-th endpoint system 130 can be a computing system that includes multiple computing devices. Alternatively, in some implementations, the n-th endpoint system 130 can be or include one or more computing devices within a computing system that includes multiple computing devices. Additionally, or alternatively, the n-th endpoint system 130 can be implemented using shared resources of a computing device (e.g., processor device 132 and memory 134 being shared with one or more other systems, applications, processes, etc.). For example, in some implementations, processor device(s) 132 can be implemented by processor device(s) 104, and memory 134 can be shared with memory 106. For example, in some implementations, processor device(s) 132 can be implemented by processor device(s) 122, and memory 134 can be shared with memory 124.

In some implementations, the n-th endpoint system 130 can be configured according to a configuration scheme 139. For instance, the configuration scheme 139 can include various requirements for interfacing with the n-th endpoint system 130. For instance, requirements can include access credentials, data formats, filesystem formats, package delivery formats, etc.

Although FIG. 1A depicts only two endpoint systems (first endpoint system 120 and n-th endpoint system 130), it is to be understood that that any number of endpoint systems can be included. For instance, FIG. 1A depicts a package delivery system 100 configurable with an arbitrary number of endpoints from the first endpoint system 120 to the n-th endpoint system 130.

The various endpoint system(s) can be the same or different. For instance, first endpoint system 120 and n-th endpoint system 130 can be the same or different. For instance, the first endpoint system 120 can be locally deployed (e.g., with a native filesystem) with the repository system 102. N-th endpoint system 130 can be remotely deployed (e.g., on the cloud) to provide an additional or alternative access location, such as a network mirror or a distribution point in a different network ecosystem. Accordingly, the configuration schemes respectively associated with the various endpoint system(s) can be the same or different. For instance, the configuration scheme 129 and the configuration scheme 139 can be the same or different.

In some implementations, the package delivery system 100 can include an operator 150. The operator 150 can be connected to network 114, the repository system 102, or various endpoint(s), for example, to monitor the states of the reference content 108 (e.g., as defined in the resource component 110 or reflected in the package repository 112) and the various endpoint(s). In some implementations, the operator 150 is implemented by the repository system 102.

In some implementations, the repository system 102 or the operator 150 can determine a change status corresponding to a difference between reference content 108 and content of an endpoint (e.g., endpoint content 128, endpoint content 138, etc.). In some examples, the repository system 102 or the operator 150 can determine that a new package has been added to the reference content 108 (e.g., a new version of an existing package, a first version of a package not previously on the repository, etc.), thereby determining a change status indicating an update to a package storage location (e.g., package storage location 126, package storage location 136, etc.), such as to add the new package to the endpoint content (e.g., endpoint content 128, endpoint content 138, etc.) to match the reference content 108. In some examples, the repository system 102 or the operator 150 can determine that a package has been removed from the reference content 108, thereby determining a change status indicating an update to a package storage location (e.g., package storage location 126, package storage location 136, etc.), such as to remove the package from the endpoint content (e.g., endpoint content 128, endpoint content 138, etc.) to match the reference content 108.

In some examples, the repository system 102 or the operator 150 can determine the change status by reference to the resource component 110 to ascertain any changes to a listing of packages in the resource component 110 that defines the reference content 108. In some examples, the repository system 102 or the operator 150 can determine the change status by reference to the package repository 112 to ascertain any changes to the packages in the package repository 112 that defines the reference content 108.

In some examples, the repository system 102 or the operator 150 can determine a change status by determining a deficiency in the endpoint content (e.g., endpoint content 128, endpoint content 138, etc.). For instance, the repository system 102 or the operator 150 can detect a fault in, error from, or deletion of package(s) of the endpoint content (e.g., endpoint content 128, endpoint content 138, etc.), thereby determining a change status indicating an update to a package storage location (e.g., package storage location 126, package storage location 136, etc.), such as to repair the respective endpoint content associated with the deficiency.

For example, in some implementations, a deficiency can include an empty package storage location (e.g., package storage location 126, package storage location 136, etc.). For example, as new endpoint(s) are brought online, the repository system 102 or the operator 150 can detect a new endpoint system and determine a change status to initialize their respective package storage location(s).

In some implementations, a change to the reference content 108 can trigger the repository system 102 or the operator 150 to request a new endpoint to be initialized. For instance, the repository system 102 or the operator 150 can process a change to a resource component 110 to indicate a new endpoint. For instance, the repository system 102 or the operator 150 can communicate with one or more service provider systems to request a new endpoint system, a new package storage location, etc.

In some implementations, the repository system 102 or the operator 150 can initiate an update for a package storage location (e.g., package storage location 126, package storage location 136, etc.). For instance initiating the update can include instructing the preparation of the update for transmission to the package storage location (e.g., package storage location 126, package storage location 136, etc.). In some examples, the repository system 102 or the operator 150 can instruct for the update to be prepared according to a respective configuration scheme associated with the respective destination endpoint for the update. For example, the repository system 102 or the operator 150 can instruct for the update to be prepared in a compatible filesystem format or compatible file format, to be transmitted using the requisite credentials or via the appropriate API, etc. In some implementations, the operator 150 can instruct the repository system 102 (e.g., one or more components of the repository system 102) to prepare or transmit the update.

Figure 1B:
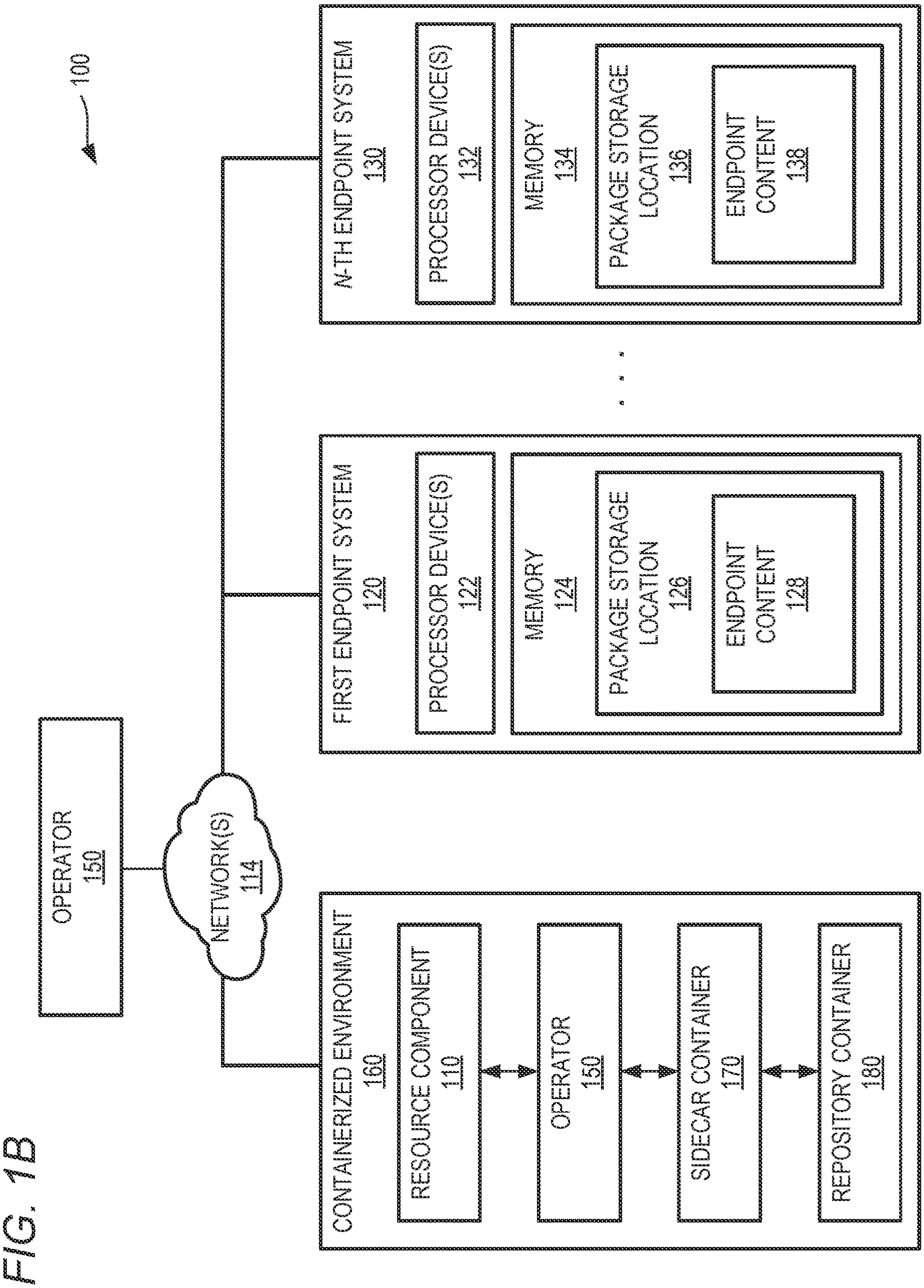
FIG. 1B is a block diagram of a runtime environment in which examples of a package maintenance architecture according to example aspects of the present disclosure can be practiced.

In some examples, the repository system 102 or the operator 150 can be implemented in a containerized environment. FIG. 1B is a block diagram of an implementation of the package delivery system 100 leveraging a containerized environment 160 according to example aspects of the present disclosure.

For instance, a repository system can be implemented as one or more containerized application(s) in a containerized environment 160. Optionally, the one or more containerized application(s) in the containerized environment 160 can collectively form the repository system 102, even if the containerized application(s) are not physically localized together. In some examples, the repository system 102 can be implemented as a pod of containerized application(s) in a containerized environment 160.

The term “containerized application” as used herein refers to an application that comprises one or more container images, and is initiated and managed via a container orchestration system. When executed, a container image is initiated as a Linux® container, wherein the Linux® kernel features cgroups and namespaces are used to isolate processes from one another. A container image is often created from a containerization technology, such as, by way of non-limiting example, Docker®, or the like. The term “container orchestration system” refers to a system that automates the deployment, scaling and management of containerized applications among nodes in a cluster. The Kubernetes® container orchestration system (Kubernetes.io) is one example of a container orchestration system. The term “resource” as used herein refers to any individual component managed by the container orchestration system for which, if requested, the container orchestration system will return information specific to the resource. In the Kubernetes® container orchestration system, each resource of an application is typically defined in a YAML Ain't Markup Language (YAML) file and has a "kind" attribute (sometimes referred to herein as "type") and a "name" attribute.

Some examples discussed herein are provided in the context of the Kubernetes® container orchestration system and using terminology used in the Kubernetes® container orchestration system; however, the examples are applicable to any container orchestration system capable of deploying, scaling, and managing containerized applications among nodes in a cluster. Container orchestration systems automate the deployment, scaling, and management of containerized applications among nodes in a cluster. A containerized application may include tens or hundreds of different containers and other resources, and each container or resource may have any number of instances distributed over many different nodes in a cluster. Increasingly, especially in conjunction with cloud computing environments, a containerized application may be distributed over many different nodes in several different clusters.

In some implementations, a containerized application can include a package management architecture. For instance, a package or repository management software can be implemented in a containerized environment for deployment as a containerized application or in support of building containerized applications. In some examples, the package management architecture can include a central hub or server (e.g., in one container or containerized environment) that communicates with a number of workers (e.g., build nodes or daemons in the same container, in the same containerized environment, etc.). In this manner, for example, the central hub can optionally centralize database read or write access. In some examples, the package management software can be the Koji® package management software architecture, which can leverage koji-hub instances and use build daemons for building packages for package repositories.

In some implementations, the containerized environment 160 can include a sidecar container 170 and a repository container 180. In some examples, the repository container 180 can contain a package management software or hub (e.g., a koji-hub deployment) for managing or building packages for one or more package repositories (e.g., which can be located in the repository container 180 or elsewhere). In some implementations, the resource component 110 can be included in the repository container 180. The sidecar container 170 can, for example, facilitate interactions with the repository container 180. For example, the operator 150 can interact with and instruct executable components in the sidecar container to perform according to aspects of the present disclosure. In some implementations, for instance, the sidecar container 170 can be configured to push updates to the endpoint(s) from the repository container 180. In some implementations, the sidecar container 170 and the repository container 180 can be co-located. In some implementations, the sidecar container 170 can be instantiated with each instance of the repository container 180 of a plurality of instantiations of repository containers. In some implementations, the sidecar container 170 can be implemented remotely from the repository container 180. For instance, in some implementations, the sidecar container 170 or the operator 150 can be provided as a service to a first-party entity (e.g., an entity associated with the repository container 180) by a third-party package management entity.

In some implementations, the operator 150 can be implemented by a native application in a containerized environment (e.g., a native application of a container orchestration system). For example, the operator 150 can be an Openshift® operator. For instance, the operator 150 can be a runtime executed by the container orchestration system to monitor and interact with containerized applications running thereon. In some examples, the operator 150 can be managed by a backplane providing lifecycle management of the operator 150, such as by overseeing installation, updates of, and control over the operator 150. In this manner, for instance, the operator 150 itself can be more resilient against downtime or error, because inadvertent editing of or deletion of the operator 150 can be resolved automatically by the backplane.

Figure 2:
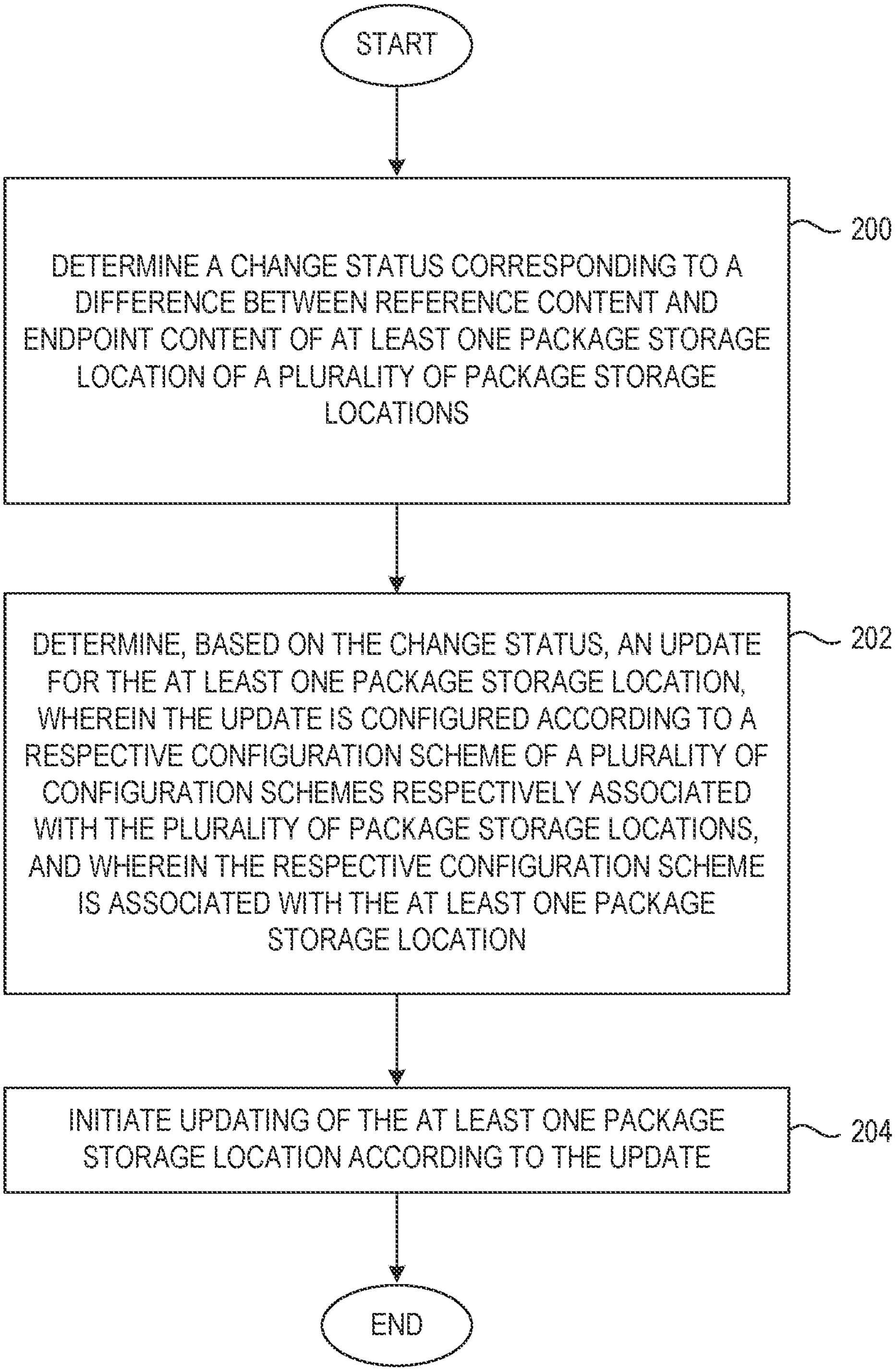
FIG. 2 is a flowchart of a method for implementing a package maintenance architecture according to example aspects of the present disclosure according to one example.

FIG. 2 is a flowchart of a method for implementing a hybrid package build architecture according to example aspects of the present disclosure. FIG. 2 will be discussed in conjunction with FIGS. 1A and 1B.

At 200, a computing system (e.g., the repository system 102, the operator 150, etc.) can determine a change status corresponding to a difference between reference content and endpoint content of at least one package storage location of a plurality of package storage locations.

At 202, a computing system (e.g., the repository system 102, the operator 150, etc.) can determine, based on the change status, an update for the at least one package storage location, wherein the update is configured according to a respective configuration scheme of a plurality of configuration schemes respectively associated with the plurality of package storage locations, and wherein the respective configuration scheme is associated with the at least one package storage location.

At 204, a computing system (e.g., the repository system 102, the operator 150, etc.) can initiate updating of the at least one package storage location according to the update.

In some implementations, a computing system (e.g., the repository system 102, the operator 150, etc.) can reference a resource component providing configuration parameters for the at least one package storage location. For instance, determining the change status can include referencing, by the computing system, a resource component providing configuration parameters for the at least one package storage location.

In some implementations, a computing system (e.g., the repository system 102, the operator 150, etc.) can monitor, using an operator component, the reference content for a new package. For instance, determining the change status can include monitoring, by the computing system and using an operator component, the reference content for a new package. In some implementations, the operator component includes a native application of a container orchestration system.

In some implementations, the new package is a new version of a preexisting package associated with the reference content.

In some implementations, a computing system (e.g., the repository system 102, the operator 150, etc.) can maintain, in a repository container managed by the container orchestration system, a package repository based on the reference content.

In some implementations, a computing system (e.g., the repository system 102, the operator 150, etc.) can receive, using a sidecar component executed in a sidecar container, a communication from the operator component indicative of the change status.

In some implementations, a computing system (e.g., the repository system 102, the operator 150, etc.) can transmit, using the sidecar component, the update to the at least one package storage location.

In some implementations, the sidecar container is co-located with the repository container.

In some implementations, the computing system comprises a containerized environment executing the sidecar container and the repository container.

Figure 3:
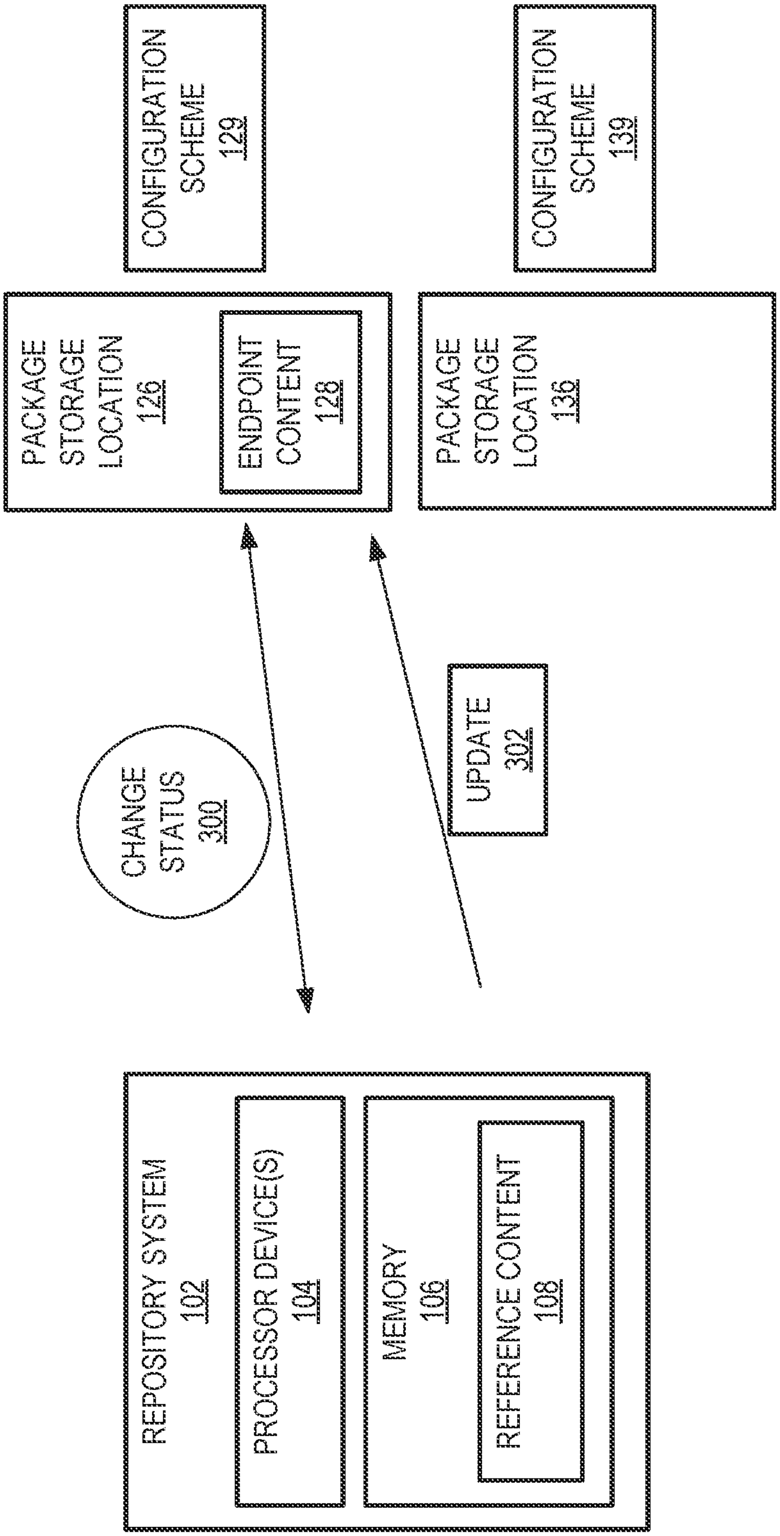
FIG. 3 is a simplified block diagram of the runtime environment illustrated in FIG. 1A according to one example.

FIG. 3 is a simplified block diagram of the environment illustrated in FIG. 1A or 1B according to one implementation. Repository system 102 can include the processor device 104 and the memory 106. The processor device 104 is coupled to the memory 106. The processor device 104 is to determine a change status 300 corresponding to a difference between reference content 108 and endpoint content 128 of at least one package storage location 126 of a plurality of package storage locations (e.g., package storage location 126 and package storage location 136). The processor device 104 is to determine, based on the change status, an update 302 for the at least one package storage location 126, wherein the update 302 is configured according to a respective configuration scheme 129 of a plurality of configuration schemes (e.g., configuration scheme 129, configuration scheme 139) respectively associated with the plurality of package storage locations (e.g., package storage location 126 and package storage location 136), and wherein the respective configuration scheme 129 is associated with the at least one package storage location 126. The processor device 104 is to initiate updating of the at least one package storage location 126 according to the update 302.

Various implementations according to the present disclosure can provide for a number of technical effects and benefits. For instance, example implementations can provide for improved system integrity and security. Relying on a manual procedure for pushing up-to-date packages to distribution endpoints can be error-prone. For instance, keeping up with the pace of development (e.g., for critical security patches, etc.) for a library of packages can be difficult if not impossible, especially when distributed networks of endpoint systems across multiple providers are each maintaining local caches of packages for rapid distribution. Updates can be missed, leaving packages unpatched and possibly risking insecure deployments. In contrast, example implementations according to the present disclosure can provide for automatic techniques for monitoring a set of reference content for updates and synchronizing and updating a number of endpoints automatically based on any changes in the reference repository system. In this manner, for instance, a package delivery system can be made more reliable and provide for package distributions backed by up-to-date dependencies for improved system integrity and security.

In some examples, example implementations can provide for improved latency for up-to-date package distribution. For instance, prior approaches to decreasing latency in a package distribution system have generally relied on downloading copies of a central repository onto various endpoints of a content distribution network, or on nodes of a networked system offering higher throughput or other speed advantages with respect to a set or group of possible recipients. While this can decrease the response time for network transmissions from the endpoints, maintaining the state of the endpoints can be an extremely time-intensive, manual process. In contrast, a package maintenance architecture according to aspects of the present disclosure can automatically maintain the state of various distributed endpoints to obtain the latency advantages of a distributed network of package storage locations while achieving the improve integrity of an up-to-date repository.

In some examples, example implementations can provide for increased speed of propagation of package updates through the package delivery system, from developer to recipient. For instance, by monitoring a repository system for updates, and pushing updates to various different package storage locations, a package maintenance architecture can rapidly propagate patches (e.g., security patches) from an external source through to an output package build deployed in a local environment.

It is noted that while, for purposes of illustration and simplicity, the embodiments are illustrated as being implemented by computing system that comprises a single computing device that in turn comprises a single processor device, in practice the examples/embodiments disclosed herein may be implemented in a computing system that comprises any number of computing devices, each of which may comprise one or more processor devices. Thus, irrespective of the implementation, the examples/embodiments may be implemented on a computing system that includes one or more computing devices, wherein the one or more computing devices comprise one or more processor devices, and the one or more processor devices are configured to implement functionality disclosed herein.

Figure 4:
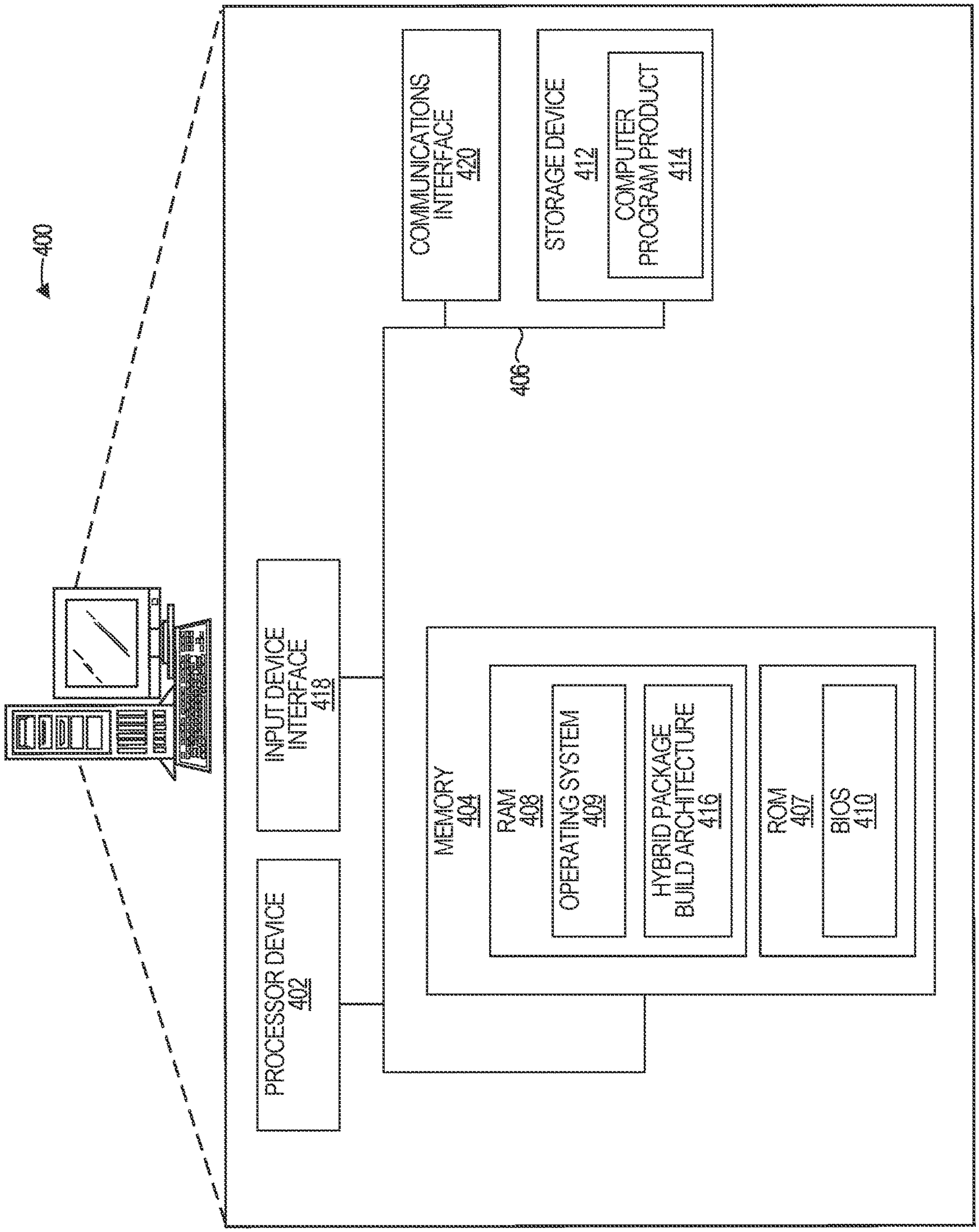
FIG. 4 is a block diagram of an example of a computing device illustrated in FIG. 1 suitable for implementing examples according to one example.

FIG. 4 is a block diagram of an example computing device (e.g., included in or implementing the repository system 102, the first endpoint system 120, the n-th endpoint system 130, the operator 150, etc.) suitable for implementing examples according to one example. The computing device 400 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 400 includes the processor device 402, the system memory 404, and a system bus 406. The system bus 406 provides an interface for system components including, but not limited to, the system memory 404 and the processor device 402. The processor device 402 can be any commercially available or proprietary processor.

The system bus 406 may be any of several types of bus structures that may further interconnect to a memory bus (with or without a memory controller), a peripheral bus, and/or a local bus using any of a variety of commercially available bus architectures. The system memory 404 may include non-volatile memory 407 (e.g., read-only memory (ROM), erasable programmable read-only memory (EPROM), electrically erasable programmable read-only memory (EEPROM), etc.), and volatile memory 408 (e.g., random-access memory (RAM)). A basic input/output system (BIOS) 410 may be stored in the non-volatile memory 407 and can include the basic routines that help to transfer information between elements within the computing device 400. The volatile memory 408 may also include a high-speed RAM, such as static RAM, for caching data.

The computing device 400 may include or be coupled to a non-transitory computer-readable storage medium, such as the storage device 412, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 412 and other drives associated with computer-readable media and computer-usable media may provide non-volatile storage of data, data structures, computer-executable instructions, and the like.

A number of modules can be stored in the storage device 412 and in the volatile memory 408, including an operating system 409 and one or more program modules, such as the hybrid package build architecture of the present disclosure (e.g., the repository system 102, the first endpoint system 120, the n-th endpoint system 130, the operator 150, etc.), which may implement the functionality described herein in whole or in part. All or a portion of the examples may be implemented as a computer program product 414 stored on a transitory or non-transitory computer-usable or computer-readable storage medium, such as the storage device 412 which includes complex programming instructions, such as complex computer-readable program code, to cause the processor device 402 to carry out the steps described herein. Thus, the computer-readable program code can comprise software instructions for implementing the functionality of the examples described herein when executed on the processor device 402. The processor device 402, in conjunction with the instructions for the hybrid package build architecture 416 loaded in the volatile memory 408, may serve as a controller, or control system, for the computing device 400 that is to implement the functionality described herein.

A user may also be able to enter one or more configuration commands through a keyboard (not illustrated), a pointing device such as a mouse (not illustrated), or a touch-sensitive surface such as a display device. Such input devices may be connected to the processor device 402 through an input device interface 418 that is coupled to the system bus 406 but can be connected by other interfaces such as a parallel port, an Institute of Electrical and Electronic Engineers (IEEE) 1394 serial port, a Universal Serial Bus (USB) port, an IR interface, and the like.

The computing device 400 may also include the communications interface 420 suitable for communicating with the network 16 as appropriate or desired. The computing device 400 may also include a video port configured to interface with a display device to provide information to the user.

Individuals will recognize improvements and modifications to the preferred examples of the disclosure. All such improvements and modifications are considered within the scope of the concepts disclosed herein and the claims that follow.

What is claimed is:

1. A method, comprising:

monitoring, by an operator component executing on a computing system implementing a container orchestration system, the computing system comprising one or more processor devices, a status of:

reference content of a repository system; and endpoint content of at least one package storage location of a plurality of package storage locations, wherein the plurality of package storage locations is implemented by one or more endpoint systems remote from the repository system; and determining, by the computing system, a change status corresponding to a difference between a current state of the reference content and a current state of the endpoint content of the at least one package storage location of the plurality of package storage locations, wherein the difference comprises a deficiency in at least one package of the endpoint content;

determining, by the computing system and based on the change status, an update for the at least one package storage location, wherein the update is configured according to a respective configuration scheme of a plurality of configuration schemes respectively associated with the plurality of package storage locations, and wherein the respective configuration scheme is associated with the at least one package storage location and defines one or more requirements for interfacing with a respective distribution endpoint that comprises the at least one package storage location;

maintaining, by the computing system and in a repository container managed by the container orchestration system, a package repository of the repository system based on the reference content; and executing, by the computing system and in a sidecar container of the container orchestration system, one or more executable components to:

in the repository container, a prepared update by preparing the update in a data format indicated for the at least one package storage location by the respective configuration scheme; and transmit, using a security credential or an application programming interface indicated for the at least one package storage location by the respective configuration scheme, the prepared update from the repository container to the at least one package storage location.

2. The method of claim 1, wherein the data format comprises a filesystem format or a package delivery format.

3. The method of claim 1, wherein the operator component is a native application of the container orchestration system, the operator component managed by a backplane of the container orchestration system that provides lifecycle management of the operator component.

4. The method of claim 1, wherein the transmitting of the prepared update to the at least one package storage location comprises:

transmitting, by the computing system using the security credential indicated for the at least one package storage location by the respective configuration scheme, the prepared update from the repository container to the at least one package storage location, wherein the security credential comprises at least one of: a token or a passkey.

5. The method of claim 1, wherein the deficiency in the at least one package of the endpoint content comprises:

a fault in the at least one package of the endpoint content; or a deletion of at least some of the at least one package of the endpoint content.

6. The method of claim 1, comprising:

receiving, by the computing system, a communication from the operator component indicative of the change status.

7. The method of claim 6, wherein the sidecar container is co-located with the repository container.

8. The method of claim 7, wherein the computing system comprises a containerized environment executing the sidecar container and the repository container.

9. A computing device, comprising:

a memory; and a processor device coupled to the memory to:

monitor, by an operator component of a container orchestration system, a status of:

reference content of a repository system; and endpoint content of at least one package storage location of a plurality of package storage locations, wherein the plurality of package storage locations is implemented by one or more endpoint systems remote from the repository system; and determine a change status corresponding to a difference between a current state of the reference content and a current state of the endpoint content of the at least one package storage location of the plurality of package storage locations, wherein the difference comprises a deficiency in at least one package of the endpoint content;

determine, based on the change status, an update for the at least one package storage location, wherein the update is configured according to a respective configuration scheme of a plurality of configuration schemes respectively associated with the plurality of package storage locations, and wherein the respective configuration scheme is associated with the at least one package storage location and defines one or more requirements for interfacing with a respective distribution endpoint that comprises the at least one package storage location;

maintain, in a repository container managed by the container orchestration system, a package repository of the repository system based on the reference content; and execute, in a sidecar container of the container orchestration system, one or more executable components to:

generate, in the repository container, a prepared update by preparing the update in a data format indicated for the at least one package storage location by the respective configuration scheme; and transmit, using a security credential or an application programming interface indicated for the at least one package storage location by the respective configuration scheme, the prepared update from the repository container to the at least one package storage location.

10. The device of claim 9, wherein the data format comprises a filesystem format or a package delivery format.

11. The device of claim 9, wherein the operator component is a native application of the container orchestration system, the operator component managed by a backplane of the container orchestration system that provides lifecycle management of the operator component.

12. The device of claim 9, wherein to transmit the prepared update to the at least one package storage location, the processor device coupled to the memory is further to:

transmit, using the security credential indicated for the at least one package storage location by the respective configuration scheme, the prepared update from the repository container to the at least one package storage location, wherein the security credential comprises at least one of: a token or a passkey.

13. The device of claim 9, wherein the processor device coupled to the memory is further to:

receive a communication from the operator component indicative of the change status.

14. The device of claim 13, comprising the sidecar container and the repository container, the sidecar container co-located with the repository container.

15. A non-transitory computer-readable storage medium that comprises executable instructions to cause one or more processor devices of one or more computing devices to:

monitor, by an operator component executing on the one or more computing devices, a status of:

reference content of a repository system; and endpoint content of at least one package storage location of a plurality of package storage locations, wherein the plurality of package storage locations is implemented by one or more endpoint systems remote from the repository system; and determine a change status corresponding to a difference between a current state of the reference content and a current state of the endpoint content of the at least one package storage location of the plurality of package storage locations, wherein the difference comprises a deficiency in at least one package of the endpoint content;

determine, based on the change status, an update for the at least one package storage location, wherein the update is configured according to a respective configuration scheme of a plurality of configuration schemes respectively associated with the plurality of package storage locations, and wherein the respective configuration scheme is associated with the at least one package storage location and defines one or more requirements for interfacing with a respective distribution endpoint that comprises the at least one package storage location;

maintain, in a repository container managed by a container orchestration system implemented by the one or more computing devices, a package repository of the repository system based on the reference content; and execute, in a sidecar container of the container orchestration system, one or more executable components to:

generate, in the repository container, a prepared update by preparing the update in a data format indicated for the at least one package storage location by the respective configuration scheme; and transmit, using a security credential or an application programming interface indicated for the at least one package storage location by the respective configuration scheme, the prepared update from the repository container to the at least one package storage location.

16. The non-transitory computer-readable storage medium of claim 15, wherein the data format comprises a filesystem format or a package delivery format.

17. The non-transitory computer-readable storage medium of claim 15, wherein the operator component is a native application of the container orchestration system, the operator component managed by a backplane of the container orchestration system that provides lifecycle management of the operator component.

* * * * *